(12) United States Patent
Utz et al.

(10) Patent No.: US 9,098,254 B2
(45) Date of Patent: Aug. 4, 2015

(54) MULTI-PURPOSE INFORMATION HANDLING SYSTEM DEVICE CONNECTOR

(75) Inventors: James Utz, Round Rock, TX (US); Andrew T. Sultenfuss, Leander, TX (US); Kevin Mundt, Austin, TX (US)

(73) Assignee: Dell Products L.P., Round Rock, TX (US)

(*) Notice: Subject to any disclaimer, the term of this patent is extended or adjusted under 35 U.S.C. 154(b) by 1162 days.

(21) Appl. No.: 13/075,809

(22) Filed: Mar. 30, 2011

(65) Prior Publication Data

US 2012/0250245 A1    Oct. 4, 2012

(51) Int. Cl.
*H05K 5/00* (2006.01)
*H05K 7/00* (2006.01)
*G06F 1/16* (2006.01)
*G06F 1/18* (2006.01)

(52) U.S. Cl.
CPC .............. *G06F 1/187* (2013.01); *G06F 1/1658* (2013.01)

(58) Field of Classification Search
CPC ......... G06F 1/187; G06F 1/16; G06F 3/0689; G06F 13/4068; G06F 1/181; G06F 1/1601; G06F 1/186; G06F 1/266; G06F 1/3221; G06F 21/78; G06F 3/0601; G06F 3/0674; G06F 1/1656; G06F 1/1675
USPC ............. 361/679.01, 679.02, 679.32–679.39; 439/76, 76.1, 248, 926; 312/223.1–223.2, 223.3
See application file for complete search history.

(56) References Cited

U.S. PATENT DOCUMENTS

| | | | |
|---|---|---|---|
| 5,078,609 A | 1/1992 | Bouchan et al. | |
| 5,922,059 A | 7/1999 | Lin et al. | |
| 6,460,947 B1 * | 10/2002 | Wah | 312/205 |
| 6,761,580 B2 * | 7/2004 | Chang | 439/502 |
| 6,793,509 B2 | 9/2004 | Chen | |
| 7,453,692 B2 * | 11/2008 | Chen | 361/679.33 |
| 7,675,745 B2 * | 3/2010 | Rankins et al. | 361/679.41 |
| 8,083,536 B2 * | 12/2011 | Leach | 439/358 |
| 2005/0080950 A1 * | 4/2005 | Rollig et al. | 710/52 |
| 2006/0050477 A1 * | 3/2006 | Wu et al. | 361/684 |
| 2008/0218959 A1 * | 9/2008 | Wu et al. | 361/685 |
| 2010/0205023 A1 * | 8/2010 | Wagner | 705/7 |
| 2011/0028046 A1 | 2/2011 | Wang et al. | |

* cited by examiner

*Primary Examiner* — Anthony Haughton
(74) *Attorney, Agent, or Firm* — Terrile, Cannatti, Chambers & Holland, LLP; Robert W. Holland

(57) ABSTRACT

An information handling system accepts a storage device in a bay that interfaces through a standardized connector having a first set of pins, such as a SATA connector. The standardized connector has a second set of pins inserted within the standardized footprint to support communication by devices other the storage device. For example, a SATA connect shares one or more of its standardized pins with a USB connector so that one common connector within an information handling system bay supports multiple types of devices.

19 Claims, 2 Drawing Sheets

MULTI-PURPOSE INFORMATION HANDLING SYSTEM DEVICE CONNECTOR

BACKGROUND OF THE INVENTION

1. Field of the Invention

The present invention relates in general to the field of information handling device connectors, and more particularly to a multi-purpose information handling system device connector.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a number of storage devices that store information, such as a hard disk drive and an optical drive. Storage devices generally communicate with other devices under the direction of firmware running on a chipset using standardized communication links, such as a Serial Advanced Technology Attachment (SATA) compatible link. Often, desktop information handling systems include multiple SATA connectors within a housing so that an end user can add SATA compatible devices as desired, such as when additional storage space is needed. Portable information handling systems and desktop information handling systems with smaller-sized housings do not typically have room within the housing to accept additional storage devices. Portable information handling systems are generally built in housings that are small enough for an end user to handle when on the move. In order to support operations when on the move, portable information handling systems typically include an integrated battery to power components and integrated I/O devices, such as an LCD and a keyboard integrated in the housing. Information handling system manufacturers attempt to design components within a portable information handling system housing so that space is used effectively to support as much functionality as possible in as small of a housing as possible for a given cost constraint.

One way to increase the flexibility of portable information handling systems is to include bays that accept modular storage devices, such as modular optical drives. A SATA Slim Line connector is disposed in a bay that is sized to accept modular optical drives. If an end user wants to support functions other than those of an optical drive installed in a bay, the user removes the optical drive from the bay and installs a replacement module that provides desired alternative functions. One example of an alternative function is a battery that fits in a modular bay to provide additional internal power for operating the information handling system. Other examples include devices that interact with the information handling system through a USB or PCIe interface. Devices that fit in a portable housing modular bay provide a wide variety of functions to increase the flexibility of information handling system use. However, increased flexibility provided by different devices tends to add a penalty of additional cost and space usage within the product design. One cause of additional cost is the need to have a variety of connectors within the modular bay in order to interface with different kinds of devices. The SATA connector of a typical optical drive does not inherently connect with all of the signals needed to make unique models that fit into a SATA connector. For example, a battery module would likely need more power pins than are available at a SATA connector. A USB hub module to add USB ports at a bay would need a USB or PCIe source within the bay to generate additional ports at a bay module. In order to obtain additional functionality, sideband signals generally must be provided to the module bay, such as by adding an interposer connector that converts a standardized connector to a customized connector or vice versa in order to add pins that support side band signals. This tends to add cost, size and complexity to the bay design.

SUMMARY OF THE INVENTION

Therefore a need has arisen for a system and method which provides a single bay connector compatible with a standardized device and one or more additional devices.

In accordance with the present invention, a system and method are provided which substantially reduce the disadvantages and problems associated with previous methods and systems for interfacing plural devices with an information handling system standardized connector. A secondary set of non-standard pins are included in the standard form factor to support communication with a secondary protocol. The secondary set of pins are placed to avoid interference with the function of the standard set of pins so that a standard device interfaces with the connector in a normal manner.

More specifically, an information handling system is built from a plurality of processing components disposed in a housing, such as a CPU, RAM and chipset that interface with a device selectively inserted in a bay formed in the housing. Storage devices fit into the bay, which aligns a device connector and a bay connector disposed in the bay. For example, an optical disc drive or hard disk drive couples to a bay connector having a SATA Slim Line standardized form factor with a first set of pins. The bay connector includes a second set of pins disposed on the SATA form factor but in positions that do not interfere with the operation of the first set of pins. Devices that fit into the bay but do not use the SATA protocol for communication have a module connector that interfaces with the second set of pins to support communication with the information handling system through the same connector that interfaces with the storage device. The second set of pins interface the device with the information handling system, or alternatively, allow a reconfiguration of the first set of pins so that communication between the device and the information handling system are supported by a second set of pins that includes one or more of the first set of pins. Alternative protocols include USB, such as to support a module that has a USB hub for adding USB ports to the information handling system, or a battery protocol such as to support a secondary battery for powering the information handling system. In one alternative embodiment, the second set of pins includes a management bus, such as an SMBus, that communicates a device protocol to a connector manager of the information handling system, which reconfigures the use made by the first set of pins.

The present invention provides a number of important technical advantages. One example of an important technical advantage is that a portable information handling system bay connector has a form and function compatible with a standardized bay module device, such as a Slim Line SATA optical drive connector, but includes additional signal pins for power and/or side band busses. The multipurpose module bay connector supports standard SATA communications with an optical drive in the bay as well as standardized or customized communications with USB, SMBus, Battery Authentication & Detection or other types of interfaces, such as customized low pin count simple busses. In a portable information handling system, non-optical disc drive devices plug into optical disc drive housing bays to provide a variety of functions with non-optical disc drive interfaces. This saves space and reduces costs by leveraging the optical disc drive connector, such as the SATA Slim Line connector, to support communication over other interfaces instead of adding secondary and tertiary connectors of additional bay module functionality. The module connector supports SATA Slim Line optical drive devices and adds bus structures, such as PCIe and USB, within the same physical size for full fidelity of other types of storage devices, such as a solid state device based upon NVMHC, PCIe or USB.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A bay in an information handling system housing has a standardized connector with a first set of pins that support a first function and a second set of pins disposed at the connector to support a second function. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
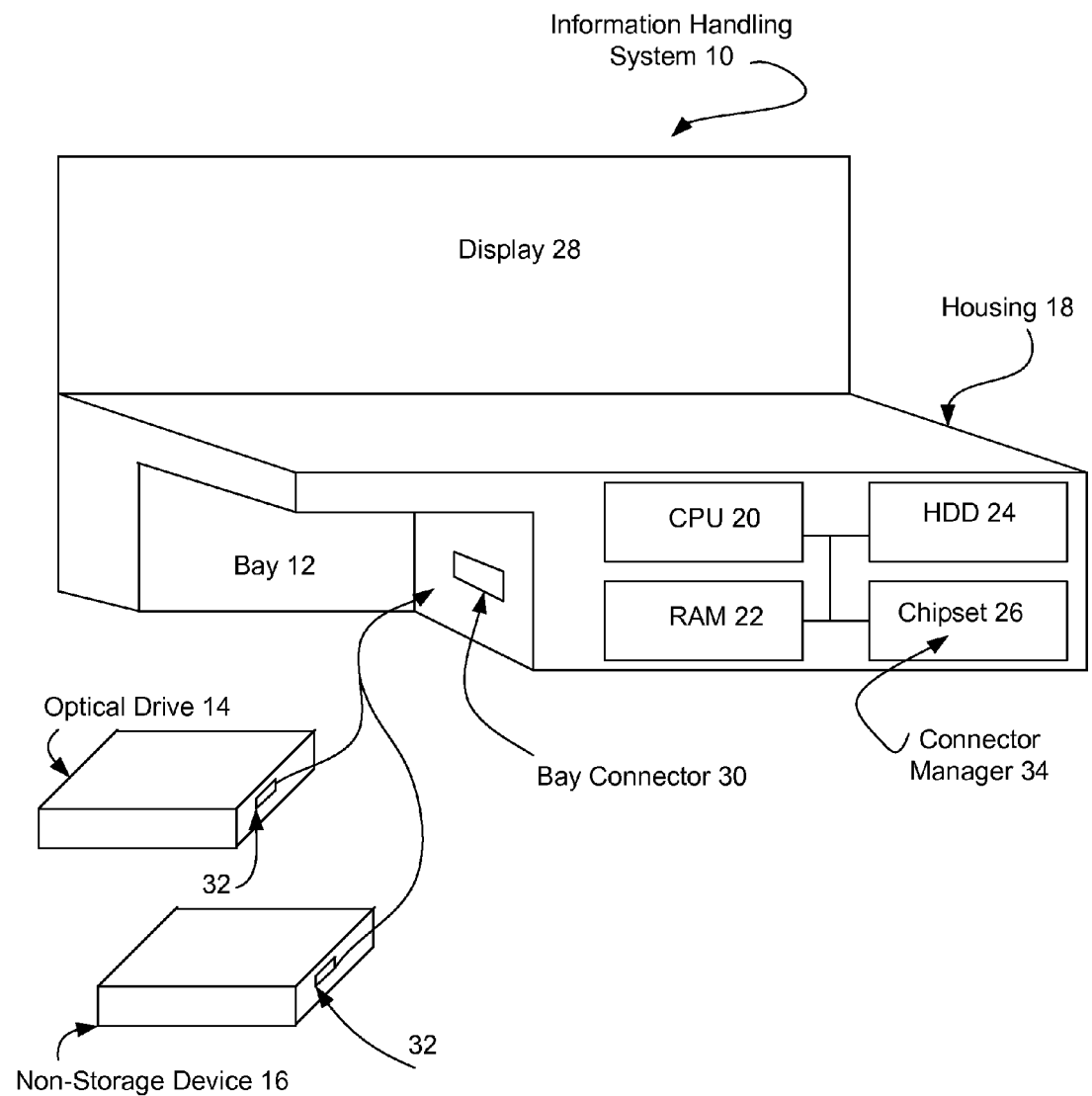
FIG. 1 depicts a portable information handling system having a bay that accepts functional modules.

Referring now to FIG. 1, a portable information handling system 10 is depicted having a bay 12 that accepts functional modules, such as a storage device functional module 14 or a non-storage device functional module 16. Information handling system 10 has plural processing components disposed in a housing 18 that is formed to include bay 12. The processing components include a CPU 20, RAM 22, a hard disk drive 24 and chipset 26 that cooperate to process information, such as by running an application over an operating system to generate information for presentation as images at an integrated display 28. Storage device module 14 stores information for use by the processing components. For example, storage device module 14 is an optical disc drive that reads and writes information at an optical medium, such as CD, DVD or BD disc. Alternatively, storage device module 14 is a hard disk drive or solid state drive. Non-storage device modules 16 provide a variety of alternative functionalities, such as providing extra power with a battery, providing extra interfaces with a USB hub, providing network communications with wireless or wired networking components or providing specialized functionality.

In order for device modules 14 and 16 to communicate with processing components within information handling system 10, pins disposed in opposing connectors interface to provide electrical communication. A bay connector 30 disposed in bay 12 aligns with and couples to a module connector 32 to provide communication of electrical signals as a module 14 or 16 is guided into bay 12 by interaction with housing 18 of information handling system 10. Bay connector 30 is a dual purpose connector that provides a standard connector form factor for supporting storage devices, such as a Slim Line SATA connector form factor for connecting with storage devices, such as an optical disc drive, hard disk drive or solid state drive. Bay connector 30 includes a first set of pins defined by the SATA standard and disposed in the SATA footprint to offer a SATA standard connection. Bay connector 30 also includes a second set of pins dispose along the SATA form factor to support alternative signal communication while avoiding interference with the functions that the first set of pins performs when a SATA device is coupled to bay connector 30. In one embodiment, second set of pins includes a management bus, such as an SMBus that communicates with a connector manager 34 running on information handling system 10. Connector manager 34 configures information handling system 10 to accept signals from the first set of pins, the second set of pins or a combination of the first and second set of pins based upon the type of device that is inserted into bay 12 as communicated through the management bus. For example, data pins of the SATA standard first set of pins are converted to communicate with a USB protocol as a non-standard second set of pins based on a protocol identifier sent through an SMBus pin of the second set of pins. For example, one pin is used for presence detect by having a reduced length that does not contact a Slim Line SATA connector but does connect with other types of connectors. In one embodiment, the presence detect provides identifier information for the type of connector interfaced, such as by communicating through an SMBus interface supported by the presence connect pin.

Figure 2:
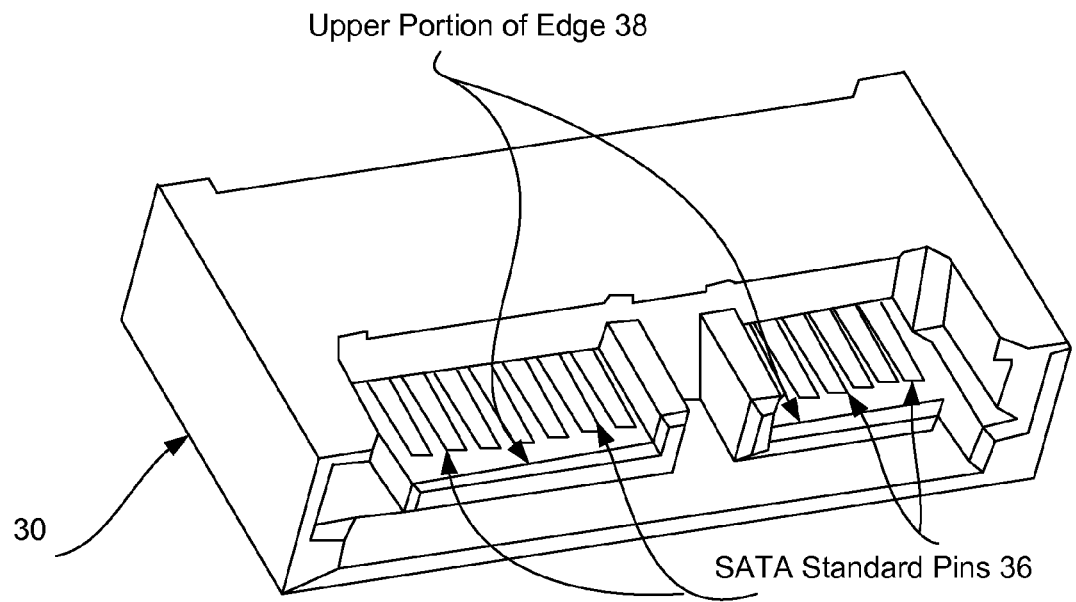
FIG. 2 depicts an upper perspective view of a multi-purpose bay connector having a SATA standard first set of pins.

Referring now to FIG. 2, an upper perspective view depicts a multi-purpose bay connector 30 having a SATA standard first set of pins 36 disposed across the upper portion of an edge 38. The SATA standard provides communication through a Slim Line SATA form factor as depicted by FIG. 2 that accepts an opposing SATA standard device connector. The SATA standard communications protocol is often used to support communication with storage devices, such as hard disk drive and solid state drives. In alternative embodiments, alternative standard connector form factors may be used in addition to the SATA embodiment depicted here.

Figure 3:
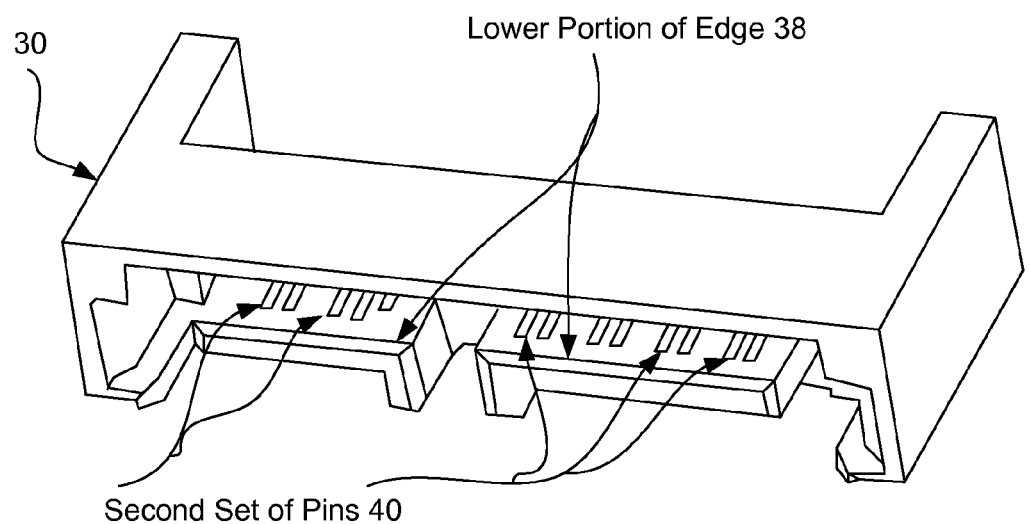
FIG. 3 depicts a lower perspective view of the multi-purpose bay connector having a second set of pins that support alternative interfaces.

Referring now to FIG. 3, a lower perspective view depicts the multi-purpose bay connector 30 having a second set of pins 40 disposed on the bottom side of edge 38 beneath the first set of SATA standard pins 36. The second set of pins 40 support alternative interfaces with information handling system 10, such as by a USB protocol, PCIe protocol, SMBus protocol or a battery protocol that allows a battery to provide power to information handling system 10 through bay connector 30. By disposing the second set of pins 40 on the lower portion of edge 38, the interface with the SATA standard form factor by first set of pins 36 is protected from interference introduced by second set of pins 40. This allows any SATA standard device to interface with bay connector 30 as if the second set of pins is not present. In alternative embodiments, the second set of pins may be disposed in other locations of bay connector 30 that are hidden to prevent interference with the function of the first set of pins. In one embodiment, the second set of pins may be disposed consistent with a form factor of an alternative connector, such as a USB connector, by including an indentation in bay connector 30 to accept a USB connector without interfering with the SATA connector functionality. Once a non-storage device 16 identifies itself to information handling system 10 through connection manager 40, signal communications between information handling system 10 may be supported by first set of pins 36, second set of pins 40 or a combination of both sets of pins. The deployment of pins in the connector are defined three dimensionally to limit interference between added and existing pins and reduce the pin count by re-use of pins in multiple connector form factors. The mating connectors that interface with bay connector 30 include a standard form factor Slim Line SATA mating connector and other types of mating connectors that align with desired of the pin sets to support a selected communications protocol.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a bay sized to accept a module;
processing components disposed in the housing and operable to cooperate to process information;
a storage device module sized to fit in the bay and operable to read information from storage and communicate the information through an interface to the processing components; and
a single connector disposed in the bay and aligned to couple with the storage device module interface when the bay accepts the storage device module, the connector having a first set of pins to support communication with the storage device module interface and a second set of pins to support communication with an alternative interface, at least some of the first set of pins being different from the second set of pins; wherein the first set of pins is disposed along an upper portion of the connector and the second set of pins is disposed along a lower portion of the connector.

2. The information handling system of claim 1 wherein the storage device module interface comprises a SATA Slim Line connector.

3. The information handling system of claim 2 wherein the alternative interface comprises a USB connector.

4. The information handling system of claim 2 wherein the alternative interface comprises a battery connector operable to provide power from a battery module disposed in the bay to the processing components.

5. The information handling system of claim 2 wherein the alternative interface comprises an SMBus connector.

6. The information handling system of claim 2 wherein the alternative interface comprises a PCIe connector.

7. The information handling system of claim 1 wherein at least some of the first set of pins also belong to the second set of pins.

8. The information handling system of claim 7 wherein at least one of the second set of pins comprises a management link operable to communicate the type of device installed in the bay.

9. The information handling system of claim 8 further comprising a connector manager running on a processing component and interfaced with the management link, the connector manager operable to configure the pins to interact with a selected of plural interfaces based upon the type of device installed in the bay.

10. A method for interfacing a device with an information handling system, the method comprising:
inserting the storage device into a bay of the information handling system;
coupling a storage device connector to a bay connector disposed within the bay;
communicating information between the device and information handling system with a first set of pins of the bay connector;
removing the storage device from the bay;
inserting a non-storage device into the bay;
coupling a connector of the non-storage device to the bay connector; and
communicating information between the non-storage device and information handling system with a second set of pins of the bay connector, at least some of the second set of pins being different from the first set of pins; wherein the first set of pins is disposed along an upper portion of the connector and the second set of pins is disposed along a lower portion of the connector.

11. The method of claim 10 wherein the storage device comprises an optical disc drive.

12. The method of claim 11 wherein the bay connector comprises a SATA Slim Line connector.

13. The method of claim 12 wherein the non-storage device comprises a battery.

14. The method of claim 12 wherein the non-storage device comprises a USB hub.

15. The method of claim 10 wherein at least some of the first set of pins are included in the second set of pins.

16. The method of claim 10 further comprising:
sending management information with the second set of pins to the information handling system; and
configuring the first set of pins to communicate with the non-storage device based upon the management information.

17. A connector for interfacing a device with an information handling system, the connector comprising:
a housing sized to fit in a standardized mating connector;

a first set of pins disposed in the housing and aligned along an upper edge of a portion of the housing to interface with mating pins of the standardized mating connector; and a second set of pins disposed in the housing, at least a portion of the second set of pins disposed along a lower edge of the portion of the housing to interface with pins of an alternative mating connector; wherein the first set of pins is disposed along an upper portion of the connector and the second set of pins is disposed along a lower portion of the connector.

18. The connector of claim 17 wherein the standardized mating connector comprises a SATA Slim Line connector and the alternative mating connector comprises a battery connector.

19. The connector of claim 17 wherein the standardized mating connector comprises a SATA Slim Line connector and the alternative mating connector comprises a USB connector.

\* \* \* \* \*